United States Patent
Harold

(10) Patent No.: US 8,135,342 B1
(45) Date of Patent: Mar. 13, 2012

(54) SYSTEM, METHOD AND APPARATUS FOR USING A WIRELESS CELL PHONE DEVICE TO CREATE A DESKTOP COMPUTER AND MEDIA CENTER

(76) Inventor: Michael D. Harold, Shreveport, LA (US)

(*) Notice: Subject to any disclaimer, the term of this patent is extended or adjusted under 35 U.S.C. 154(b) by 1034 days.

(21) Appl. No.: 11/898,912

(22) Filed: Sep. 17, 2007

Related U.S. Application Data

(60) Provisional application No. 60/844,645, filed on Sep. 15, 2006.

(51) Int. Cl.
*H04B 5/00* (2006.01)
(52) U.S. Cl. ... 455/41.1; 455/41.2; 455/557; 455/556.1; 455/41.3
(58) Field of Classification Search .............. 455/41.1, 455/41.2, 557, 556.1, 41.3
See application file for complete search history.

(56) References Cited

U.S. PATENT DOCUMENTS

| | | | | |
|---|---|---|---|---|
| 6,914,695 | B2* | 7/2005 | Walters et al. | 358/1.15 |
| 2002/0054345 | A1* | 5/2002 | Tomida et al. | 358/1.15 |
| 2006/0105718 | A1* | 5/2006 | Ozluturk et al. | 455/67.11 |
| 2006/0258289 | A1* | 11/2006 | Dua | 455/41.3 |
| 2007/0136778 | A1 | 6/2007 | Birger et al. | |
| 2008/0125039 | A1* | 5/2008 | Glinka | 455/41.2 |
| 2008/0192806 | A1* | 8/2008 | Wyper et al. | 375/133 |
| 2008/0259039 | A1* | 10/2008 | Kocienda et al. | 345/173 |
| 2009/0197652 | A1* | 8/2009 | Lundstrom et al. | 455/574 |

* cited by examiner

*Primary Examiner* — Sanh Phu
(74) *Attorney, Agent, or Firm* — Van Dyke Law; Raymond Van Dyke

(57) ABSTRACT

A system, method and apparatus which permits the use of a wireless cell phone or other communications device as a connection, communications and control device able to connect a full-sized desktop monitor or other digital display device, keyboard, mouse, speakers, printer and other external devices to a wireless cell phone device using any combination of wireline or wireless connections from the desktop devices to the wireless cell phone device. The wireless cell phone device is used to create an Internet or other network connection capable of accessing any browser-based web site or browser-based software application commonly accessible to a standard desktop computer having an Internet connection. Once the connections between the desktop monitor, keyboard, mouse, speakers, printer and other components are established with the wireless cell phone device and the Internet connection is established with the wireless cell phone device, the user may access any browser-based web site or software application using the desktop monitor, keyboard, mouse, speakers, printer and other components. Access to Internet software, services and media includes all forms of browser-based desktop software, as well as digital movies, music, and streaming video.

76 Claims, 9 Drawing Sheets

SYSTEM, METHOD AND APPARATUS FOR USING A WIRELESS CELL PHONE DEVICE TO CREATE A DESKTOP COMPUTER AND MEDIA CENTER

CROSS-REFERENCE TO RELATED APPLICATIONS

This application claims priority to U.S. Provisional Application Ser. No. 60/844,645, filed Sep. 15, 2006, the entire contents of which are hereby incorporated by reference.

This application is also related to U.S. patent application Ser. No. 11/889,941, filed Aug. 17, 2007, the entire contents of which are hereby incorporated by reference.

BACKGROUND OF THE INVENTION

1. Field of the Invention

The present invention relates generally to methods for using a wireless cell phone or other communications device in combination with a desktop computer monitor, keyboard and mouse to create a desktop computing environment. In particular, the invention relates to a system, method and apparatus in which the user of a wireless cell phone device establishes a direct connection with a desktop computer monitor, keyboard, mouse or other component using any combination of wireline connections and wireless connections. The present invention also relates to techniques for leveraging the use of a handheld communication device to other devices.

2. Description of the Related Art

Changes in the use and technological capabilities of wireless cell phone and other communications devices, e.g., Blackberry and Palm devices, have led to the rapid adoption of handheld cell phone devices as personal communications tools capable of supporting voice mail, email, calendars, contact lists and related applications. Handheld wireless devices are also commonly used to store and access music, videos and other forms of electronic entertainment and media. The increasing availability of Internet services and applications, particularly those that store a user's data in a computer server, data center or other location on the network independently of the user's handheld or desktop computer, and make that data available to other Internet or network-hosted services and applications, have given end-users the ability to access and store their important data, documents and applications on the Internet, e.g., using a browser in combination with their desktop computer hardware and software. With further technological advances, the traditional personal computer will be eclipsed by this on-going "off-shelving" process of moving data to more remote resources dedicated for this purpose.

Software applications, such as word processors, spreadsheets and database applications, generally require the use of a traditional desktop computer having a CPU, large amounts of random access memory, and one or more disk drives. Software applications and services available over the Internet, however, no longer require a high-performance CPU, large amounts of random access memory, a desktop computer disk drive or a traditional desktop computer operating system for their operation. What these Internet software applications and services do require to operate effectively is a sufficiently high bandwidth Internet or other network connection, a sufficiently capable browser, and standard desktop input and output devices, such as a digital display screen, keyboard and mouse, printer, and a speaker or a speaker system.

Although a number of companies, including Texas Instruments and Siemens, currently offer rudimentary products that allow a cell phone to project images, presentations and movies onto a wall or other nearby surface, Applicant is unaware of any product that allows a cell phone to transmit browser-based content to a nearby full-size digital display device, such as a computer monitor, or otherwise leverage the capabilities of the cell phone or other communications device in this matter.

In all cases where wireless cell phone devices are used to send and receive data, the user is confined to the use of the cell phone itself as a handheld computing device. None of the current methodologies for using a wireless cell phone device as a computer take into account the need or desire to have a full-size computer monitor or other full-size digital display device as a visual output device, as well as a full-size keyboard and full-size mouse device as user-operated input devices for manipulating data or issuing commands remotely through the handheld communications device. Specifically, the prior art fails to demonstrate any system, method or apparatus that disengages wireless cell phone and other communications device users from the ergonomic constraints of the small, low-resolution displays presently associated with handheld computing devices, and the small, portable keypad and control key input devices presently associated with handheld computing devices.

Furthermore, the prior art also fails to demonstrate any system, method or apparatus, whereby a wireless cell phone device may be used in place of a traditional computer, i.e., treat a wireless cell phone or other communications device as a thin client. In this instance, the thin client has only a TCP/IP software interface, browser software capable of supporting a high-resolution desktop monitor, the software device drivers necessary to allow desktop computer-based Internet software applications and services to communicate directly with the desktop monitor, keyboard, mouse, speakers and printer devices, and the peripheral communications hardware and software necessary to establish physical communications with the desktop monitor, keyboard, mouse, speakers and printer devices. In other words, this paradigm removes any requirements for the disk drives and other high-capacity storage mechanisms normally associated with desktop computers.

Furthermore, the prior art fails to demonstrate any system, method or apparatus that allows wireless cell phone users to access forms of digital media, including movies, music, and streaming video over the Internet or other network, and to display and otherwise transmit that media through the cell phone to full-size audio and video devices, such as desktop computer monitors, digital display screens and speaker systems directly or indirectly attached to the wireless cell phone device.

There is, therefore, a present need to provide an improved paradigm for using a wireless cell phone or other such communications device as a central component of a desktop or other such computing environment. For example, in the desktop environment this includes a desktop computer monitor or other full-size digital display device used as a visual output device, and a full-size desktop keyboard and mouse as a user input device, thereby allowing the wireless device user to overcome the aforementioned ergonomic and other constraints of existing handheld wireless devices, and better exploit the enhancements of the new wireless and other technologies offered, particularly as Web 3.0 concepts are enabled.

There is a further need to provide an improved paradigm for using a wireless cell phone or other communications device as a central component of a desktop or other such computing environment that includes, in addition to a desktop computer monitor and a desktop keyboard and mouse, the use of desktop speakers and a desktop printer.

SUMMARY OF THE INVENTION

In contrast to the traditional model of wireless cell phone usage, the present invention involves a system, method and apparatus that permits the use of a wireless cell phone or other such communications device as a connection, communications and control device able to connect a full-sized desktop monitor or other digital display device, keyboard, mouse, speakers, printer and other components to a wireless cell phone device, using any combination of wireline or wireless connections from the desktop devices to the wireless cell phone device. The wireless cell phone device of the present invention is used to create an Internet or other network connection capable of accessing any browser-based web site or browser-based software application commonly accessible to a standard desktop computer having an Internet connection. Once the connections between the desktop monitor, keyboard, mouse, speakers, printer and/or other components are established with the wireless cell phone device, and the Internet connection is established with the wireless cell phone device, the user may access any browser-based web site or software application using the desktop monitor, keyboard, mouse, speakers and printer. Access to Internet software, services and media includes all forms of browser-based desktop software, as well as digital movies, music, and streaming video.

It is, accordingly, an object of the present invention to provide an improved paradigm for the use of a wireless cell phone or other such communications device as a connection, communications and controlling device for desktop devices, including a digital display monitor, keyboard and mouse, where these desktop devices are used to access and operate desktop browser-based software applications and software services available over the Internet.

It is another object of the present invention to provide an improved system, method and apparatus for the use of a wireless cell phone device as a connection, communications and controlling device for additional desktop devices, including, but not limited to, a desktop printer and a desktop speaker or speaker system, where these devices are used in conjunction with desktop browser-based software applications and software services available over the Internet.

It is another object of the present invention to provide an improved system, method and apparatus for a wireless cell phone device user to connect a desktop monitor, keyboard, mouse, printer and/or other components to a wireless cell phone device using any combination of wireline or wireless connections.

It is a further object of the present invention to provide an improved system, method and apparatus for a wireless cell phone device user to specify the devices to which the wireless cell phone will connect using any combination of hardware connection devices contained in the wireless cell phone device and software connectivity options contained within the wireless cell phone device.

It is a further object of the present invention to provide an improved system, method and apparatus, whereby a wireless cell phone device may be used to control the display of content on the desktop computer monitor through the use of browser software designed to display visual output on full-sized digital display devices, such as a desktop computer monitor or consumer display devices, e.g., television.

It is a further object of the present invention to provide an improved system, method and apparatus, whereby a wireless cell phone device may be used to control output to an external speaker or a speaker system, a printer or other components through the use of software and hardware contained in the wireless cell phone device.

It is a further object of the present invention to provide an improved system, method and apparatus, whereby a wireless cell phone or other communications device will use an Internet connection to access software programs and software services whose user interfaces can be displayed through a desktop computer monitor or other digital display device connected to the wireless cell phone device.

It is a further object of the present invention to provide an improved system, method and apparatus, whereby a wireless cell phone device will combine the functions of an Internet access and communication device with those of a connection, communications and controlling device for a desktop monitor, keyboard, mouse, speakers and printer.

It is a further object of the present invention to provide an improved system, method and apparatus, whereby a wireless cell phone device will, while under the control of an integrated wireless keyboard and mouse attached to the wireless cell phone device, provide Internet or other network access to various forms of digital streaming media including movies, music and video and to display and or otherwise transmit that media through the wireless cell phone device to full-size, high-resolution digital display devices and speakers or a speaker system.

It is a further object of the present invention to provide an improved system, method and apparatus, whereby a wireless cell phone device can, while simultaneously providing Internet or other network access to various forms of digital streaming media, including movies, music and video and displaying and or otherwise transmitting that media through the wireless cell phone device to full-size, high-resolution digital display devices and speakers or a speaker system, also be used as a handheld controller device to select and play said media.

BRIEF DESCRIPTION OF THE DRAWINGS

A more complete understanding of the improved system, method and apparatus of the present invention may be obtained by reference to the following Detailed Description when taken in conjunction with the accompanying Drawings wherein.

DETAILED DESCRIPTION OF THE INVENTION

Figure 1:
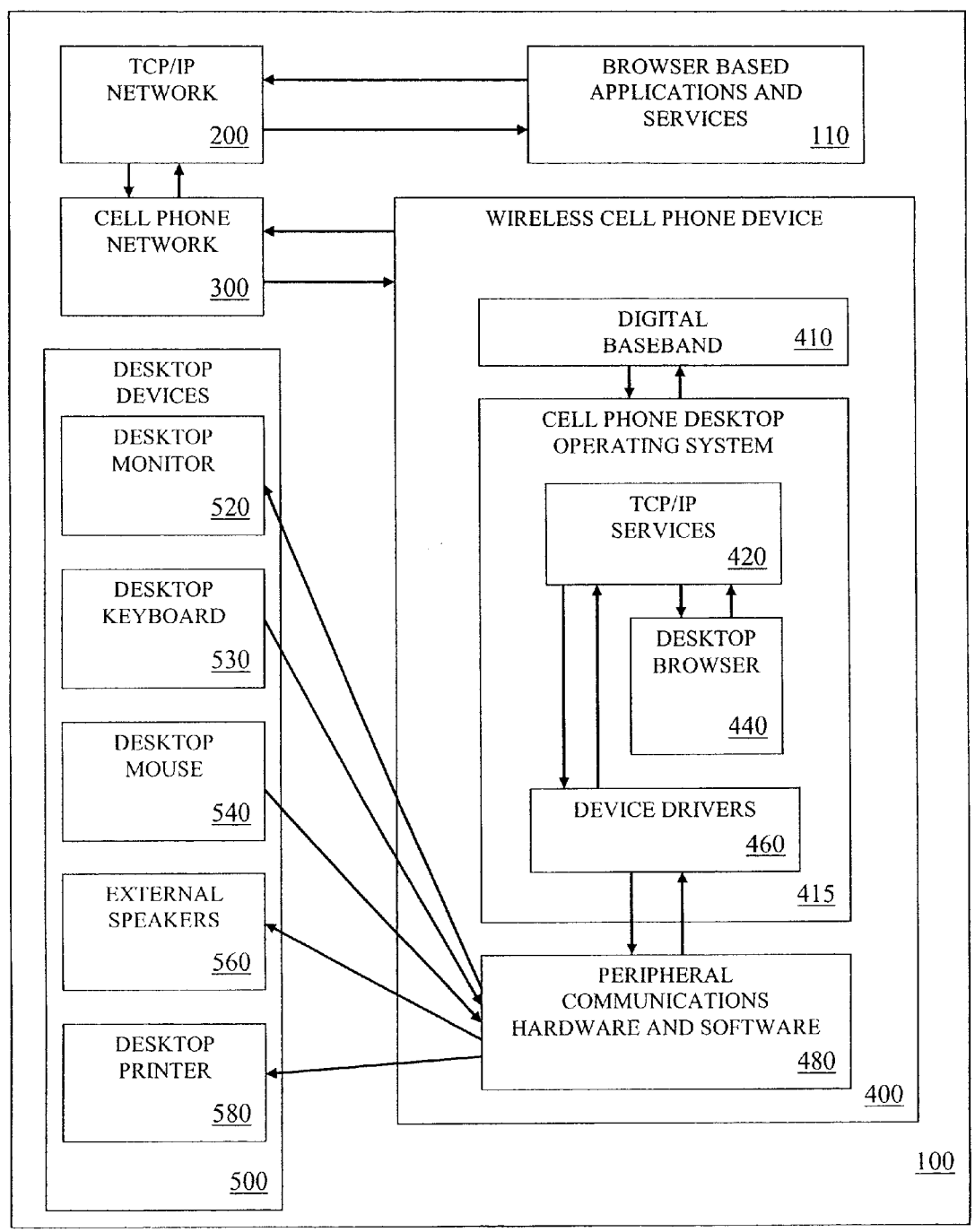
FIG. 1 illustrates an exemplary Internet-based desktop computing environment using a wireless cell phone or other communications device in accordance with the principles of the present invention.

The following detailed description is presented to enable any person skilled in the art to make and use the invention. For purposes of explanation, specific nomenclature is set forth to provide a thorough understanding of the present invention. However, it will be apparent to one skilled in the art that these specific details are not necessarily required to practice the invention, and descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The present invention relates generally to improved methods for using a wireless cell phone or other communications device in combination with a desktop computer monitor, a desktop printer and desktop speakers as output devices, and a desktop computer keyboard and desktop mouse as input devices to create a desktop computing environment. In particular, the invention relates to a method and system in which the user of a wireless cell phone device establishes a direct connection with a desktop computer monitor or other form of full-sized, high-resolution digital display device, a desktop keyboard and mouse, a desktop printer and a desktop speaker or speaker system using any combination of one or more wireline connections and one or more wireless connections set forth in more detail herein below and shown in the exemplary figures.

By enabling the wireless cell phone device to transmit visual output to the computer monitor, receive data input from the keyboard and mouse device, print output on the printer, and transmit sound to the speaker or speaker system, the wireless cell phone device can be made to operate as a traditional desktop computing environment, i.e., one having a full-sized computer screen, keyboard, mouse, printer and speakers. Applications normally associated with a desktop computing environment include, but are not limited to, word processing, spreadsheets and database applications, and may be accessed over the Internet or other network as browser-enabled software applications or software services.

User inputs to these various applications and services can be made using the desktop keyboard and mouse connected to the cell phone device. Digital display information, such as provided by the network applications or software services, will be transmitted to the desktop computer monitor by the cell phone device. Audio, such as provided by the software applications and software services, is transmitted through the cell phone device to an external speaker or speaker system. Printable output, such as provided by the software applications and software services, is transmitted through the cell phone device to the printer. Other forms of media, including movies, music and streaming video, may likewise be accessed over the Internet using the desktop computing environment, and transmitted to an attached digital display screen and speakers. All of these transmissions may be made through the wireless cell phone device's browser interface, which may be made to display information in a traditional browser window for interacting with Internet programs and services or in a full-screen windowless mode for viewing movies and other forms of streaming media, as is understood in the art.

With reference now to FIG. 1 of the Drawings, there is illustrated therein a first embodiment for practicing the principles of the present invention, which operates within a distributed communications network, generally designated by the reference numeral 100. As shown in the figure, a wireless cell phone or other communications device 400 is connected to one or more desktop devices 500, including but not limited to a desktop monitor 520, a desktop keyboard 530, a desktop mouse 540, an external speaker or a speaker system 560, and a desktop printer 580, through one or more wireline or wireless connections with the wireless cell phone device's 400 peripheral communications hardware and software, generally designated by the reference numeral 480. The wireless cell phone device 400 also uses a cell phone network 300 to access a TCP/IP network 200 that, in turn, provides access to one or more browser-based applications and or services 110 over the wireless cell phone device's 400 digital baseband 410.

The wireless cell phone device 400 also has a cell phone desktop operating system, generally designated by the reference numeral 415, including TCP/IP services 420, desktop browser software 440 and device drivers 460. As shown in FIG. 1, the user of the cell phone device 400 uses the desktop browser software 440 in conjunction with the TCP/IP services 420 to send messages and data to, and receive messages and data from the browser-based applications and or services 110 via the digital baseband 410. Messages and data received from the browser-based applications and services 110 are communicated to the desktop browser 440 through the TCP/IP services 420, interpreted by the desktop browser 440, and transmitted by the TCP/IP services 420 to the appropriate device drivers 460, where they are communicated through the peripheral communications hardware and software 480 to one or more user output devices that may include the aforementioned desktop monitor 520, external speakers 560, the desktop printer 580 or other external components.

User input in the form of messages and data received from the desktop devices 500, including the desktop keyboard 530, the desktop mouse 540, and other external components are received by the peripheral communications hardware and software 480, and communicated to the TCP/IP services 420. It should be understood that the messages and data that are intended for the desktop browser 440 are communicated by the TCP/IP services 420 to the desktop browser 440, and other messages and data, not intended for communication to the desktop browser 440, are instead managed by the TCP/IP services 420. The desktop browser 440 identifies and translates the input it receives from the TCP/IP services 420 and directs those output messages and data for communication with the browser-based applications and services 110 and the TCP/IP services 420, and transmitted to the browser-based applications and services 110 via the digital baseband 410, cell phone network 300 and TCP/IP network 200.

The desktop browser 440 also identifies and translates received input from the TCP/IP services 420 into output messages and data that are communicated to one or more of the desktop devices 500, such as the aforementioned desktop monitor 520, the external speakers 560, the desktop printer 580, and other external components, and transmit those messages and data to the appropriate desktop devices 500 via the aforementioned TCP/IP services 420, device drivers 460 and peripheral communications hardware and software 480. Once the communication between the wireless cell phone device 400 and the desktop devices 500 are established, and the communication between the wireless cell phone device and the browser-based applications and or services 110 are established, the user may then use the desktop devices 500 to both access and use the browser-based programs and/or services 110 through the wireless cell phone device 400.

Figure 2A:
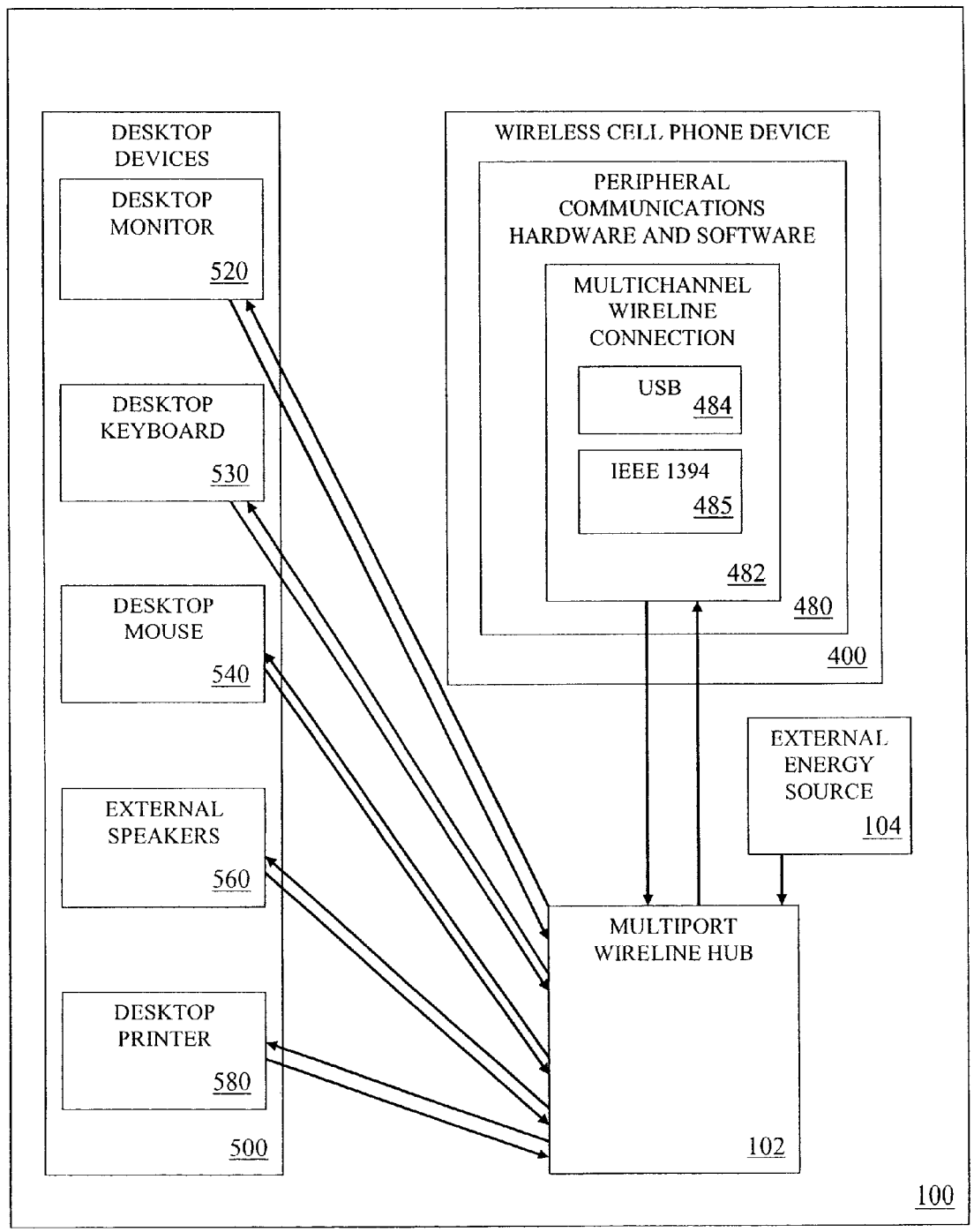
FIG. 2A illustrates another exemplary Internet-based desktop computing environment using a wireless cell phone device, in which various peripheral devices, including a desktop computer monitor, keyboard, mouse, speakers, printer and other external components, may be made to communicate with the wireless cell phone device using multiple wireline connections.

With reference now to FIG. 2A of the Drawings, there is illustrated therein another embodiment of the present invention, which also operates within a distributed communications network, generally designated by the reference numeral 100. In this embodiment wireline interconnectivity between the cell phone device 400 and the desktop environment is addressed with reference again to FIG. 2A. A wireless cell phone device 400 is connected to one or more of the aforementioned desktop devices 500, including, but not limited to, a desktop monitor 520, a desktop keyboard 530, a desktop mouse 540, external speakers or a speaker system 560, a desktop printer 580, and other external components, through a multichannel wireline connection 482, which is itself a component of the wireless cell phone device's 400 peripheral communications hardware and software 480. It should be understood that the multichannel wireline connection 482 may provide support for one or more broadband communications protocols, including, but not limited to, the Universal Serial Bus (USB) protocol 484 and the IEEE 1394 protocol, generally designated by the reference numeral 485, as well as future like protocols. In an effort to reduce the physical connection requirements of the peripheral communications and software 480 on the wireless cell phone device 400 to a single physical connection, a multiport wireline hub 102 may be used to physically connect the wireless cell phone device 400 to the desktop devices 500. Furthermore, in order to reduce the energy requirements associated with the operation of the wireless cell phone device 400, the multiport wireline hub 102 may obtain its electricity from an external energy source 104.

Figure 2B:
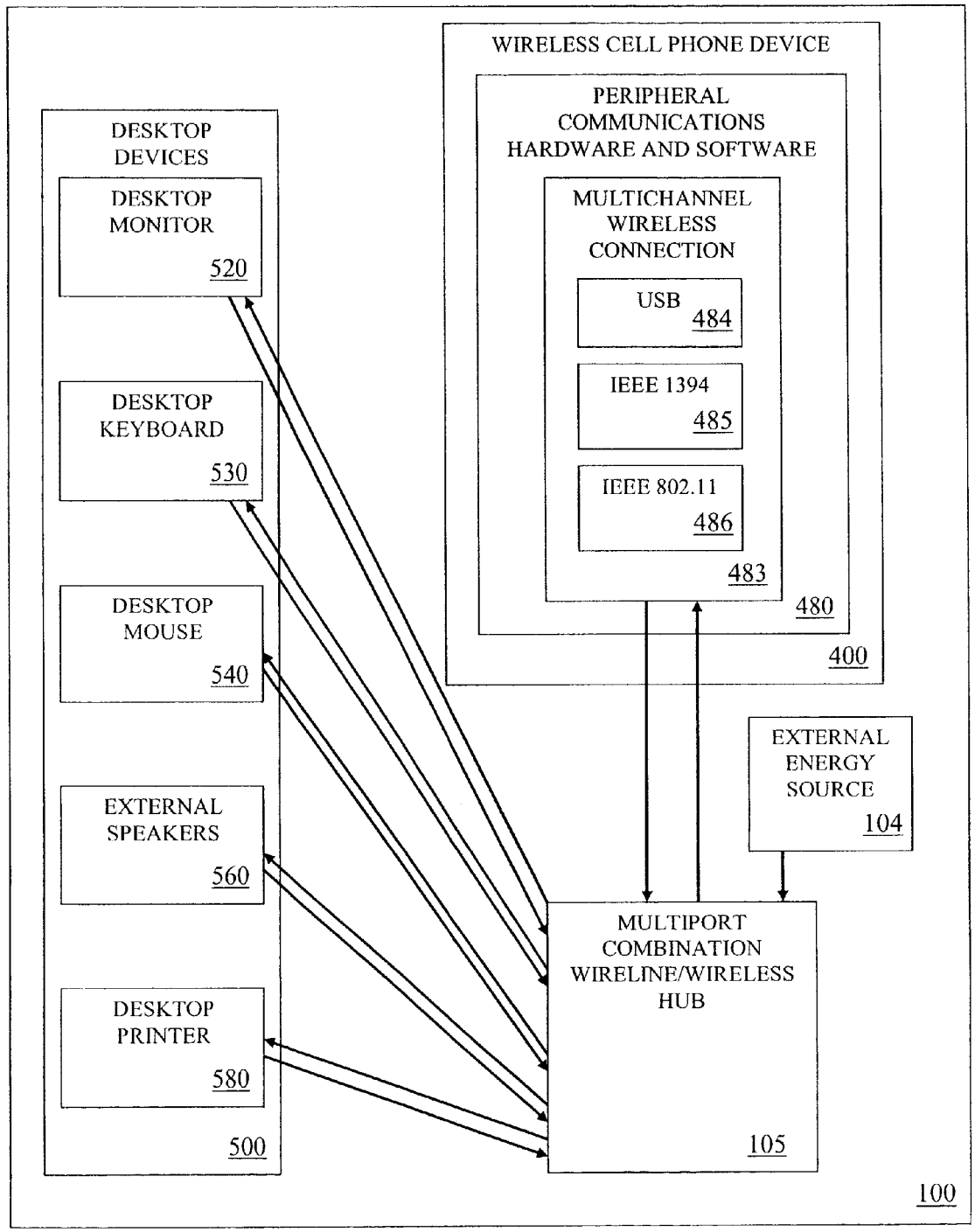
FIG. 2B illustrates a further exemplary Internet-based desktop computing environment using a wireless cell phone device in which various peripheral devices, including a desktop computer monitor, keyboard, mouse, speakers, printer and other external components, may be made to communicate with the wireless cell phone device using a wireless connection with the wireless cell phone device and any combination of wireline and wireless connections with the various peripheral devices.

With reference now to FIG. 2B of the Drawings, there is illustrated therein a distributed communications network, again generally designated by the reference numeral 100, utilizing the principles of the present invention. A wireless cell phone device 400 is connected to one or more desktop devices 500, including, but not limited to, a desktop monitor 520, a desktop keyboard 530, a desktop mouse 540, external speakers or a speaker system 560, and a desktop printer 580, through a multichannel wireless connection 483, itself a component of the wireless cell phone device's 400 peripheral communications hardware and software 480. As with the aforementioned multichannel wireless connection 482, it should be understood that the multichannel wireless connection 483 may provide support for one or more broadband communications protocols, including, but not limited to, the Universal Serial Bus USB protocol 484, the IEEE 1394 protocol 485 and the IEEE 802.11 protocol, generally designated by the reference numeral 486, as well as future like protocols. In an effort to reduce the physical connection requirements of the peripheral communications hardware and software 480 on the wireless cell phone device 400 to a multichannel wireless connection, a multiport combination wireline/wireless hub 105 may be used to physically connect the wireless cell phone device 400 to the desktop devices 500. The hub 105 has a wireless connection with the peripheral communications hardware and software 480 on the wireless cell phone device 400 via the multichannel wireless connection 483 and either a wireline or wireless connection with the various desktop devices 500. Furthermore, in order to reduce the energy requirements associated with the operation of the wireless cell phone device 400, the multiport wireless hub 103, as with the aforementioned hub 102, may obtain its electricity from an external energy source 104.

Figure 2C:
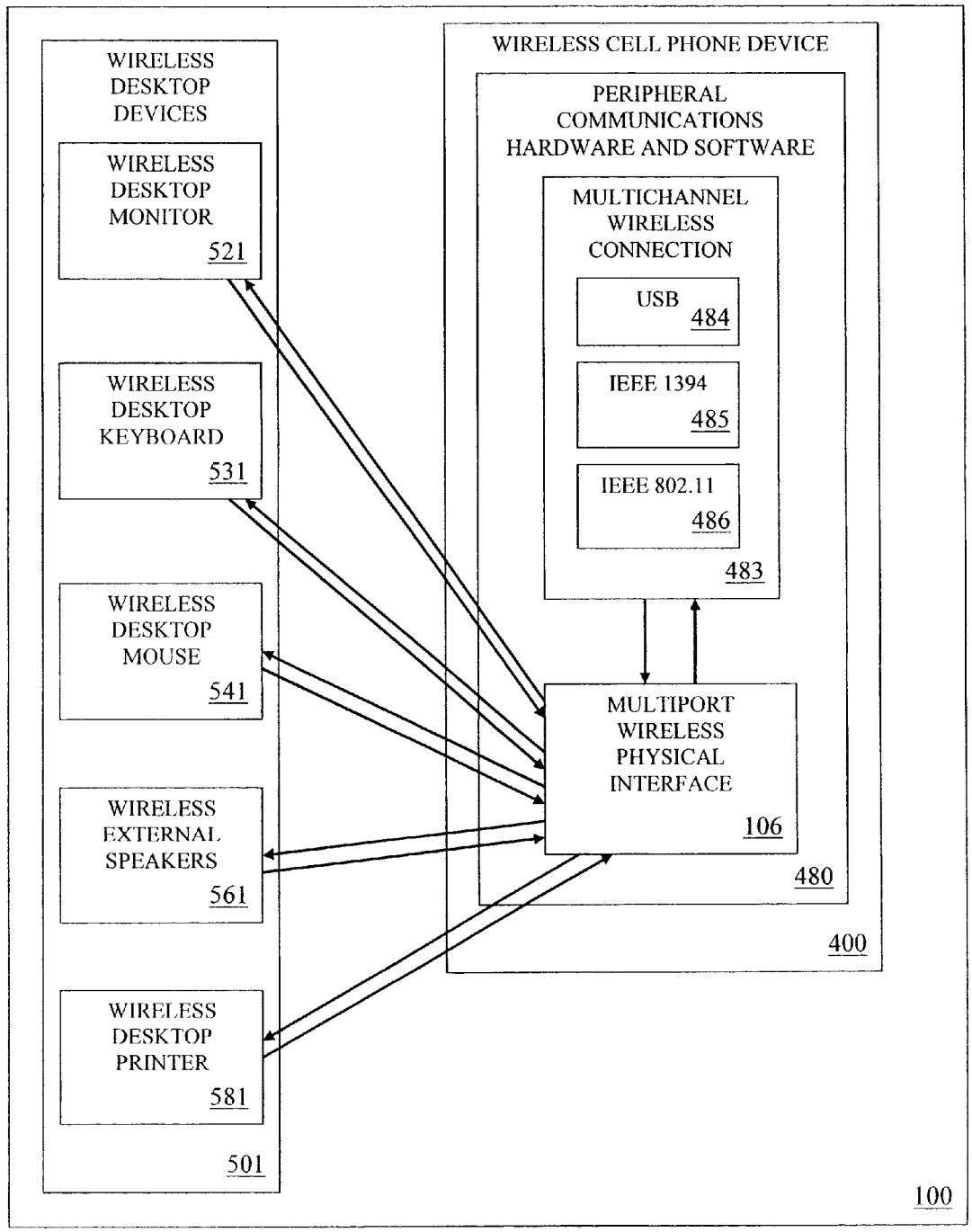
FIG. 2C illustrates another exemplary Internet-based desktop computing environment using a wireless cell phone device, in which various wireless peripheral devices, including a desktop computer monitor, keyboard, mouse, speakers, printer and other external components, may be made to communicate with the wireless cell phone device using a wireless connection with the wireless cell phone device and wireless connections with the various peripheral devices.

With reference now to FIG. 2C of the Drawings, there is illustrated therein a distributed communications network, generally designated by the reference numeral 100, utilizing the principles of the present invention. A wireless cell phone device 400 is connected to one or more wireless desktop devices, generally designated by the reference numeral 501, including, but not limited to, a wireless desktop monitor 521, a wireless desktop keyboard 531, a wireless desktop mouse 541, a wireless external speaker or a speaker system 561, and a wireless desktop printer 581, through a multichannel wireless connection 483, itself a component of the wireless cell phone device's 400 peripheral communications hardware and software 480. It should be understood that the multichannel wireless connection 483 may provide support for one or more broadband communications protocols, including, but not limited to, the aforementioned Universal Serial Bus (USB) protocol 484, the IEEE 1394 protocol 485 and the IEEE 802.11 protocol 486. An internal multiport wireless physical interface 106, also a component of the wireless cell phone device's peripheral communications hardware and software 480, takes the place of an external hub device. The internal multiport wireless physical interface 106 provides one or more wireless multiport network connections between one or more instances of Universal Serial Bus (USB) protocol 484 communications, IEEE 1394 protocol 485 communications and IEEE 802.11 protocol 486 communications, and the wireless desktop devices 501. When implemented as a physical device, such as a chip or other form of integrated circuit, the internal multiport wireless physical interface 106 removes the need for a physical connection between the wireless cell phone device 400 and the wireless desktop devices 501, and also removes the need for an external multiport wireless hub.

Figure 3A:
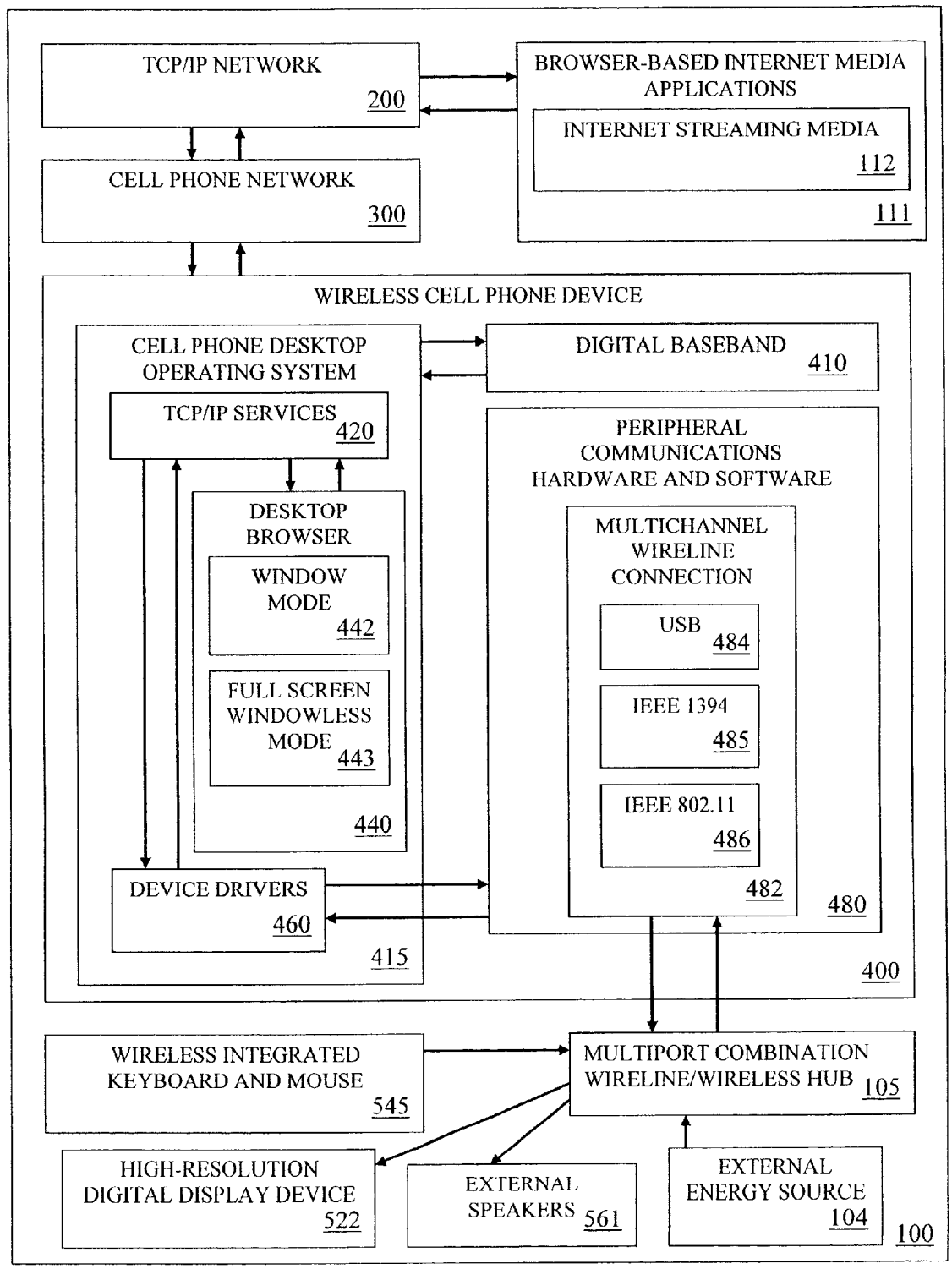
FIG. 3A illustrates another exemplary Internet-based desktop computing environment using a wireless cell phone device, in which high-resolution, high bandwidth digital media including movies, music and streaming video may be transmitted through the wireless cell phone device to full-size audio and digital display devices, a speaker or a speaker system, and other external components attached to the wireless cell phone device through a combination of wireline and wireless connections.

With reference now to FIG. 3A of the Drawings, there is illustrated therein a distributed communications network, generally designated by the reference numeral 100, utilizing the principles of the present invention. In the figure, a wireless cell phone device 400 is connected to one or more wireless features, including, but not limited to, a wireless keyboard and mouse, preferably integrated 545, a high-resolution digital display device 522, and an external speaker or a speaker system 561, through one or more wireless connections. For example, the wireless cell phone device 400 connection between the wireless integrated keyboard and mouse 545 and a multiport combination wireline/wireless hub 105, one or more wireline and or wireless connections between the high-resolution digital display device 522 and the multiport combination wireline/wireless hub 105, one or more wireline and or wireless connections between the external speaker or speaker system 561 and the multiport combination wireline/wireless hub 105, and one or more wireline and or wireless connections between the multiport combination wireline/wireless hub 105 and a multichannel wireline connection 482 of the wireless cell phone device 400, the hub 105 itself a component of the wireless cell phone device's 400 peripheral communications hardware and software 480.

In an effort to reduce the physical connection requirements of the peripheral communications and software 480 on the wireless cell phone device 400 to a single physical connection, the multiport combination wireline/wireless hub 105 may be used to physically connect the wireless cell phone device 400 to the wireless integrated keyboard and mouse 545, the high-resolution digital display device 522 and the external speaker or speaker system 561. Furthermore, in order to reduce the energy requirements associated with the operation of the wireless cell phone device 400, the multiport combination wireline/wireless hub 105 may obtain its electricity from an external energy source 104.

With further reference to FIG. 3A, the wireless cell phone device 400 uses a cell phone network 300 to access a TCP/IP network 200 that, in turn, provides access to browser-based Internet media applications 111 over the wireless cell phone device's 400 digital baseband 410. The wireless cell phone device's 400 cell phone desktop operating system 415, consisting of TCP/IP services 420, desktop browser software 440 and device drivers 460, uses its desktop browser software 440 in conjunction with its TCP/IP services 420 to send messages and data to, and receive messages and data from, the browser-based Internet media applications 111 via the digital baseband 410. Messages and data received from the browser-based Internet media applications 111 are communicated to the desktop browser 440 through the TCP/IP services 420, interpreted by the desktop browser 440 and transmitted by the TCP/IP services 420 to appropriate device drivers 460, where they are communicated through the peripheral communications hardware and software 480 to one or more user output devices that may include a high-resolution digital display device 522 and external speakers or speaker system 561.

User input in the form of messages and data originating from the wireless integrated keyboard and mouse 545 are received by the peripheral communications hardware and software 480, where they are communicated to the TCP/IP services 420. Those messages and data that are intended for the desktop browser 440 are communicated by the TCP/IP services 420 to the desktop browser 440. Other messages and data not intended for communication to the desktop browser 440 are managed by the TCP/IP services 420. The desktop browser 440 identifies and translates the input received from the TCP/IP services 420, and directs those output messages and data to the browser-based Internet media applications 111 to the TCP/IP services 420 where they are transmitted to the browser based internet media applications 111 via the digital baseband 410, cell phone network 300 and TCP/IP network 200. The desktop browser 440 also identifies and translates input received from the TCP/IP services 420 into output messages and data that are to be communicated to either the high-resolution digital display device 522 or the external speaker or speaker system 561, and transmits those messages and data to the appropriate devices via the TCP/IP services 420, device drivers 460 and peripheral communications hardware and software 480.

Once the communications between the wireless cell phone device 400 and the wireless integrated keyboard and mouse 545, the high-resolution digital display device 522 and the external speakers or speaker system 561 are established and the communication between the wireless cell phone device and the browser-based Internet media applications 111 are established, the user may use the wireless integrated keyboard and mouse 545 in combination with the high-resolution digital display device 522 to both access and use the browser-based Internet media applications 111 through the wireless cell phone device 400 and through the use of the browser-based Internet media applications 111, select, download and control the Internet streaming media 112 associated with the browser-based Internet media applications.

With further reference to FIG. 3A, the wireless integrated keyboard and mouse 545 may be used to control the desktop browser 440 in a manner that optimizes the Internet streaming media 112 viewing experience of the user. By using the wireless integrated keyboard and mouse 545 to select either of two display modes of the desktop browser 440, the user may select the window mode 442 to obtain access to the browser-based media applications 111, or the user may select the full-screen windowless mode 443 to display the Internet streaming media 112 without the viewer distraction of a traditional browser interface. By providing the user with the opportunity to toggle back and forth between the window mode 442 and the full-screen windowless mode 443, those methods of controlling the viewer experience, such as forward and reverse, stop, pause and resume play, may be made available through the interaction of the wireless integrated keyboard and mouse 545 with the browser-based Internet media applications.

Figure 3B:
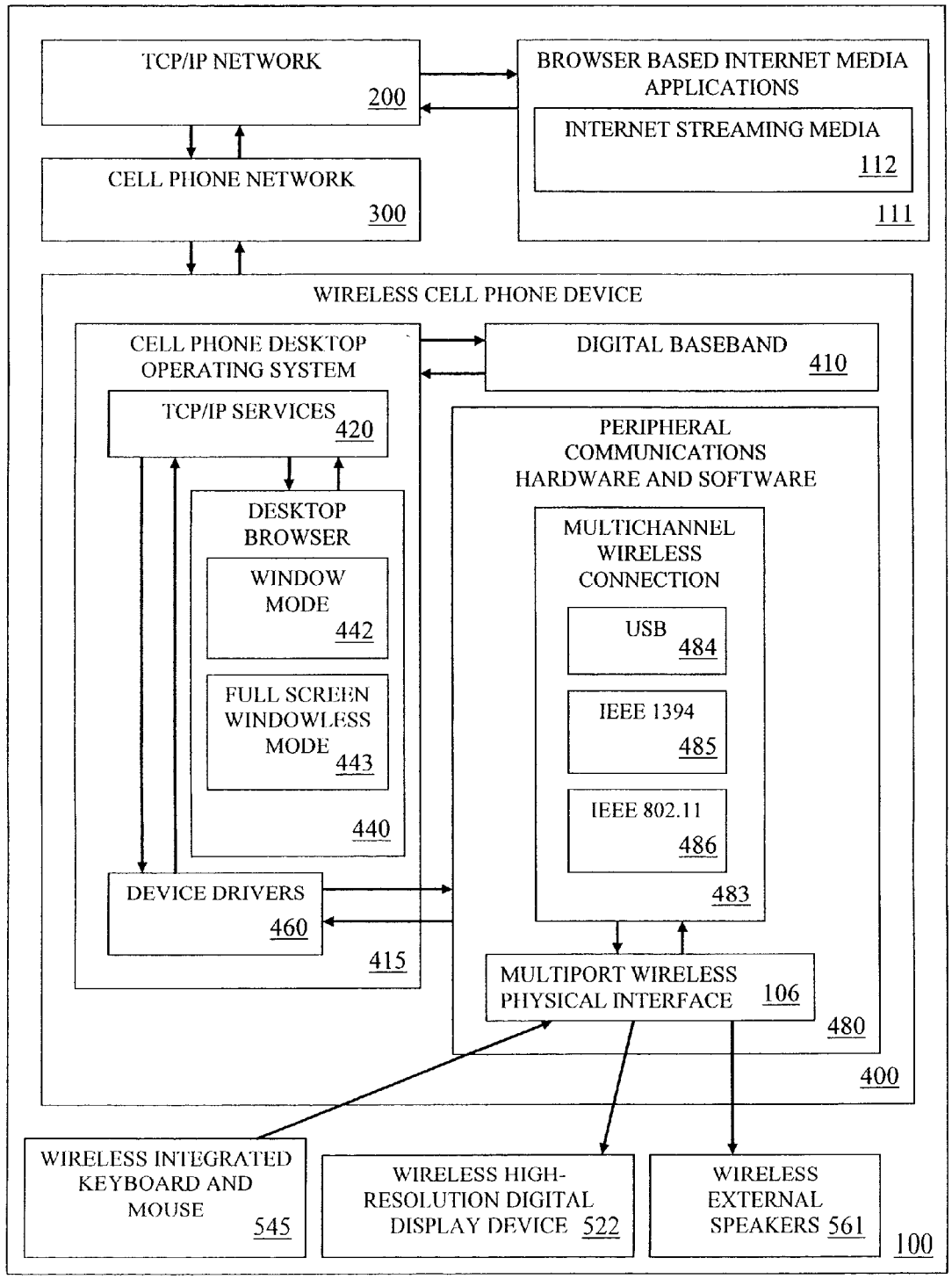
FIG. 3B illustrates a further exemplary Internet-based desktop computing environment using a wireless cell phone device, in which high-resolution, high bandwidth digital media, including movies, music and streaming video, may be transmitted through the wireless cell phone device to full-size audio and digital display devices, a speaker or a speaker system, and other external components attached to the wireless cell phone device through a multiport wireless physical interface contained within the wireless cell phone device.

With reference now to FIG. 3B of the Drawings, there is illustrated therein a distributed communications network, generally designated by the reference numeral 100, utilizing the principles of the present invention. In the figure, a wireless cell phone device 400 is connected to one or more features, including, but not limited to, the aforementioned wireless integrated keyboard and mouse 545, a wireless high-resolution digital display device 522 and an external speaker or a speaker system 561, through one or more wireless connections. For example, the wireless cell phone device connection between the wireless integrated keyboard and mouse 545 and the multiport wireless physical interface 106, one or more wireless connections between the high-resolution digital display device 522 and the multiport wireless physical interface 106, one or more wireless connections between the external speakers or speaker system 561 and the multiport wireless physical interface 106, and a physical connection between the cell phone device's 400 multiport wireless physical interface 106 and a multichannel wireless connection 483 of the wireless cell phone 400.

Figure 3C:
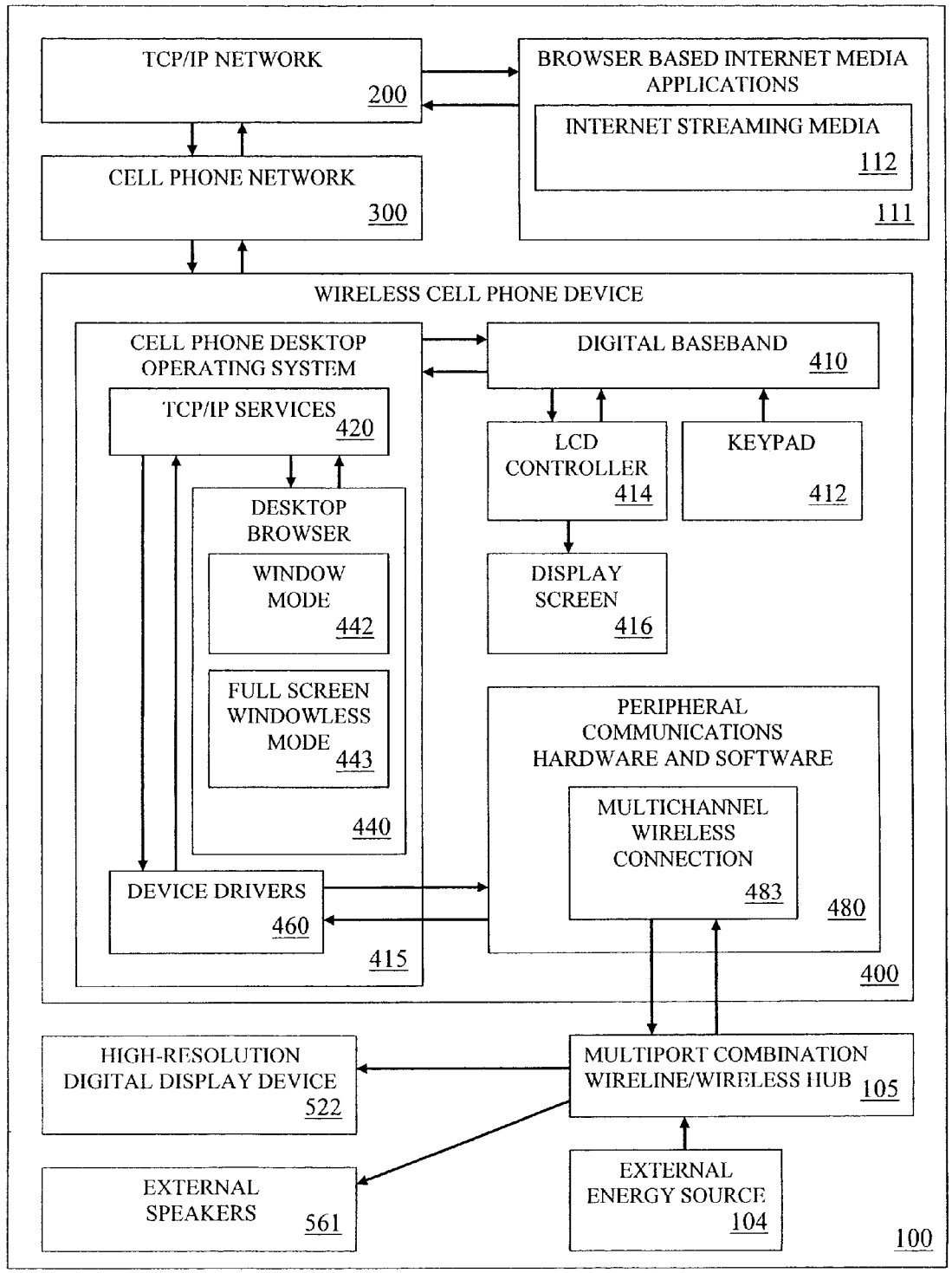
FIG. 3C illustrates another exemplary Internet-based desktop computing environment using a wireless cell phone device, in which high-resolution, high bandwidth digital media, including movies, music and streaming video, may be transmitted through the wireless cell phone device to full-size audio and digital display devices, a speaker or a speaker system, and other external components attached to the wireless cell phone device through a combination of wireline and wireless connections, while at the same time the wireless cell phone device is used to select and play said media.

With reference now to FIG. 3C of the Drawings, there is illustrated therein a distributed communications network, again generally designated by the reference numeral 100, utilizing the principles of the present invention. In the figure, a wireless cell phone device 400 is connected to one or more features, including, but not limited to, the aforementioned high-resolution digital display device 522 and an external speaker or a speaker system 561, through one or more wireline and or wireless connections. For example, the wireless cell phone 400 connection between the high-resolution digital display device 522 and the multiport combination wireline/wireless hub 105, one or more wireline and or wireless connections between the external speaker or speaker system 561 and the multiport combination wireline/wireless hub 105, and one or more wireline and or wireless connections between the multiport combination wireline/wireless hub 105 and the aforementioned multichannel wireline/wireless connection 483, itself a component of the wireless cell phone device's 400 peripheral communications hardware and software 480. In an effort to reduce the physical connection requirements of the peripheral communications and software 480 on the wireless cell phone device 400 to a single physical connection, the multiport combination wireline/wireless hub 105 may be used to physically connect the wireless cell phone device 400 to the high-resolution digital display device 522 and the external speaker or speaker system 561. Furthermore, in order to reduce the energy requirements associated with the operation of the wireless cell phone device 400, the multiport combination wireline/wireless hub 105 may obtain its electricity from an external energy source 104.

With further reference to FIG. 3C, the wireless cell phone device 400 uses a cell phone network 300 to access a TCP/IP network 200 that, in turn, provides access to browser-based Internet media applications 111 over the wireless cell phone device's 400 digital baseband 410. The wireless cell phone device's 400 cell phone desktop operating system 415, consisting of TCP/IP services 420, desktop browser software 440 and device drivers 460, uses its desktop browser software 440 in conjunction with its TCP/IP services 420 to send messages and data to, and receive messages and data from, the browser-based Internet media applications 111 via the digital baseband 410. Messages and data received from the browser-based Internet media applications 111 are communicated to the desktop browser 440 through the TCP/IP services 420, interpreted by the desktop browser 440 and transmitted by the TCP/IP services 420 to the appropriate device drivers 460, where they are communicated through the peripheral communications hardware and software 480 to one or more user output devices that may include a high-resolution digital display device 522 and the external speaker or speaker system 561.

User input in the form of messages and data originating from the wireless cell phone device's 400 keypad 412 are transmitted through the digital baseband 410 where they are communicated to the TCP/IP services 420. Those messages and data that are intended for the desktop browser 440 are communicated by the TCP/IP services 420 to the desktop browser 440. Other messages and data not intended for communication to the desktop browser 440 are managed by the TCP/IP services 420. The desktop browser 440 identifies and translates the input it receives from the TCP/IP services 420 and directs those output messages and data to be communicated to the browser-based Internet media applications 111 to the TCP/IP services 420, where they are transmitted to the browser-based Internet media applications 111 via the digital baseband 410, cell phone network 300 and TCP/IP network 200. The desktop browser 440 also identifies and translates the input it receives from the TCP/IP services 420 into output messages and data that are to be communicated to the cell phone device's 400 display screen 416, the high-resolution digital display device 522 or the external speaker or speaker system 561, and transmits those messages and data to either the cell phone device's 400 display screen 416 via the digital baseband 410 and LCD controller 414 or to the high-resolution digital display device 522 or external speaker or speaker system 561 via the TCP/IP services 420, device drivers 460 and peripheral communications hardware and software 480.

Once the communications between the wireless cell phone device 400 and the and high-resolution digital display device 522 and the external speaker or speaker system 561 are established and the communication between the wireless cell phone device and the browser-based Internet media applications 111 are established, the user may use the wireless cell phone device's 400 keypad 412 and display screen 416 in combination with the high-resolution digital display device 522 to both access and use the browser-based Internet media applications 111 through the wireless cell phone device 400 and through the use of the browser-based Internet media applications 111, select, download and control the internet streaming media 112 associated with the browser based internet media applications.

With further reference to FIG. 3C, the wireless cell phone device's 400 keypad 412 and display screen 416 may be used to control the desktop browser 440 in a manner that optimizes the Internet streaming media 112 viewing experience of the user. By using the wireless cell phone device's 400 keypad 412 and display screen 416 to select either of two display modes of the desktop browser 440, the user may select the window mode 442 to obtain access to the browser-based media applications 111, or the user may select the full-screen windowless mode 443 to display the internet streaming media 112 without the viewer distraction of a traditional browser interface. By providing the user with the opportunity to toggle back and forth between the window mode 442 and the full-screen windowless mode 443, those methods of controlling the viewer experience, such as forward and reverse, stop, pause and resume play, may be made available through the interaction of wireless cell phone device's 400 keypad 412 and display screen 416 with the browser-based Internet media applications.

Figure 3D:
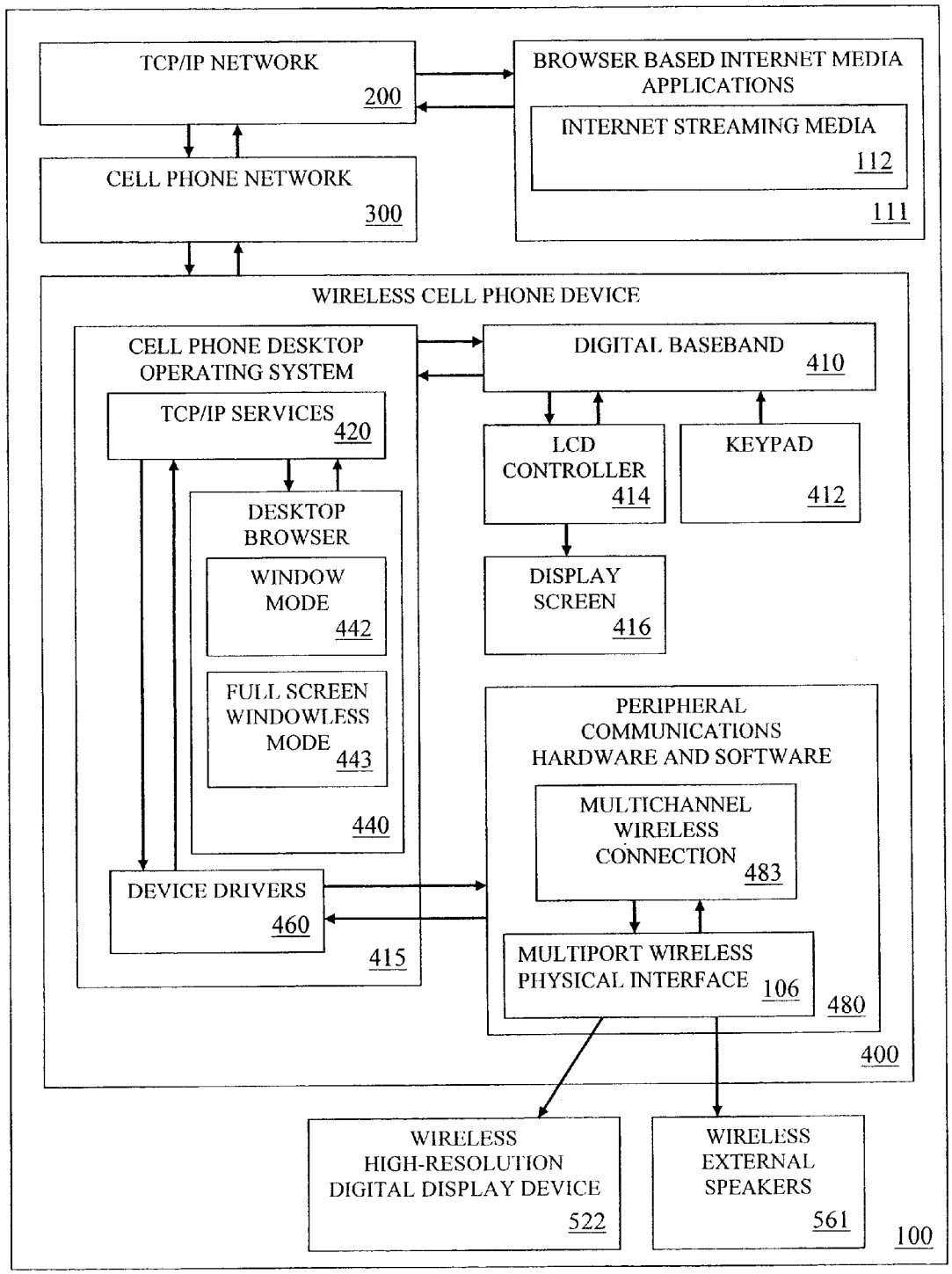
FIG. 3D illustrates a further exemplary Internet-based desktop computing environment using a wireless cell phone or other communications device, in which high-resolution, high bandwidth digital media, including movies, music and streaming video, may be transmitted through the wireless cell phone device to full-size wireless audio and digital display devices, a speaker or a speaker system, and other external components attached to the wireless cell phone device through a multiport wireless physical interface contained within the wireless cell phone device, while at the same time the wireless cell phone device is used to select and play said media.

With reference now to FIG. 3D of the Drawings, there is illustrated therein a distributed communications network, generally designated by the reference numeral 100, utilizing the principles of the present invention. A wireless cell phone device 400 is connected to a high-resolution digital display device 522 and external speakers or a speaker system 561 through one or more wireless connections between the high-resolution digital display device 522 and the multiport wireless physical interface 106, one or more wireless connections between the external speaker or speaker system 561 and the multiport wireless physical interface 106, and a physical connection between the cell phone device's 400 multiport wireless physical interface 106 and the wireless cell phone device's 400 multichannel wireless connection 483.

In practice, the principles of the present invention have a wide applicability in the consumer marketplace. As noted, users increasingly store important information, e.g., documents and applications, as well as entertainment, e.g., songs and movies, remotely on an Internet-accessible server. Instead of inserting a disk or tape, users now download an electronic version of a work and play that. Of course, numerous non-entertainment usages can be envisioned also, e.g., remotely accessing a document, spreadsheet, database, presentation or any software application, and use made pursuant to the present invention. As wireless connectivity predominates, users will tend to change traditional paradigms of data usage, and employ referential techniques, such as presented herein to access personal information, i.e., an example of the Web 3.0 movement.

Through use of the techniques of the present invention, users are freed from the contemporary physical constraints of common handheld devices, necessitating by size restrictions. Leveraging the functionability of available physical devices to provide better ergonomic conditions is a key concept of the present invention.

For example, users accessing steaming video on their cell phone may desire to watch that video or a movie on a large screen display, perhaps high definition as well. The user can either provide a wireline connection, such as a simple USB connection, or a wireless interface, such as a device hub, and readily connect the content being accessed on the cell phone to the available display for easier viewing. Similarly, a song may be played on a stereo system, thereby providing better acoustical conditions for the hearer.

Likewise, the user may wish to edit or view a document on a larger screen rather than the limited one of the cell phone, whatever its capabilities. Elderly users, for example, may access a display, personal or perhaps public, to better view text or other content. Naturally, as typing or editing would be eased by resort to a larger screen, keyboards and mouse are far more useful than existing data input and editing tools. Lastly, printing by necessity must be done by a physical device connection, e.g., the cell phone user requests a printout of a document stored on a remote server.

Gamers, for example, can better experience the graphics and multimedia functionality of a game by so leveraging remote devices associated to the user. The cell phone or other communications device 400 operated in this fashion, provides the gamer with flexibility of usage, e.g., use of others' equipment such as within a gaming salon or station.

It should also be understood that in the embodiment described herein, the user controls the user information or media. For example, the user, through their cell phone, may directly control various peripheral devices, e.g., through commands entered in the cell phone by the user or automatically pursuant to user instructions. For example, the user in this cell phone command mode may directly control a computer without use of any peripheral devices, e.g., keyboard or mouse, associated with that computer or other device. Alternatively, the user may transfer various controls to the peripheral devices, e.g., using the computer keyboard or mouse to navigate through the user information, a website or other media, play a game or access media, thereby making data or command entry easier with more ergonomic devices, e.g., a gamer playstation or other console. In addition, the user may, while displaying user information on a peripheral device, simultaneously enter commands, e.g., typing central commands on the cell phone during a movie or steaming video on a selected peripheral device.

An apparatus pursuant to the teachings of the present invention would provide the user thereof with flexibility of presentation, usage and control. For example, the user could be shopping and a vendor of some product, e.g., speakers, could provide a weblink or other information useful to the user to directly access a speaker product for sale, e.g., play a song stored in the user's personal space on the Internet or attached in an email on the desired speaker, mediated through the cell phone or other communications device. Although a preferred embodiment of the instant invention is creation of a desktop computing environment through a separate communications device, the principles also apply in similar contexts where the user leverages the communications device to increase or improve upon the characteristics of the device in hand. In other words, the principles of the present invention are not just applicable in the home, but may be employed in numerous other contexts.

Figure 4:
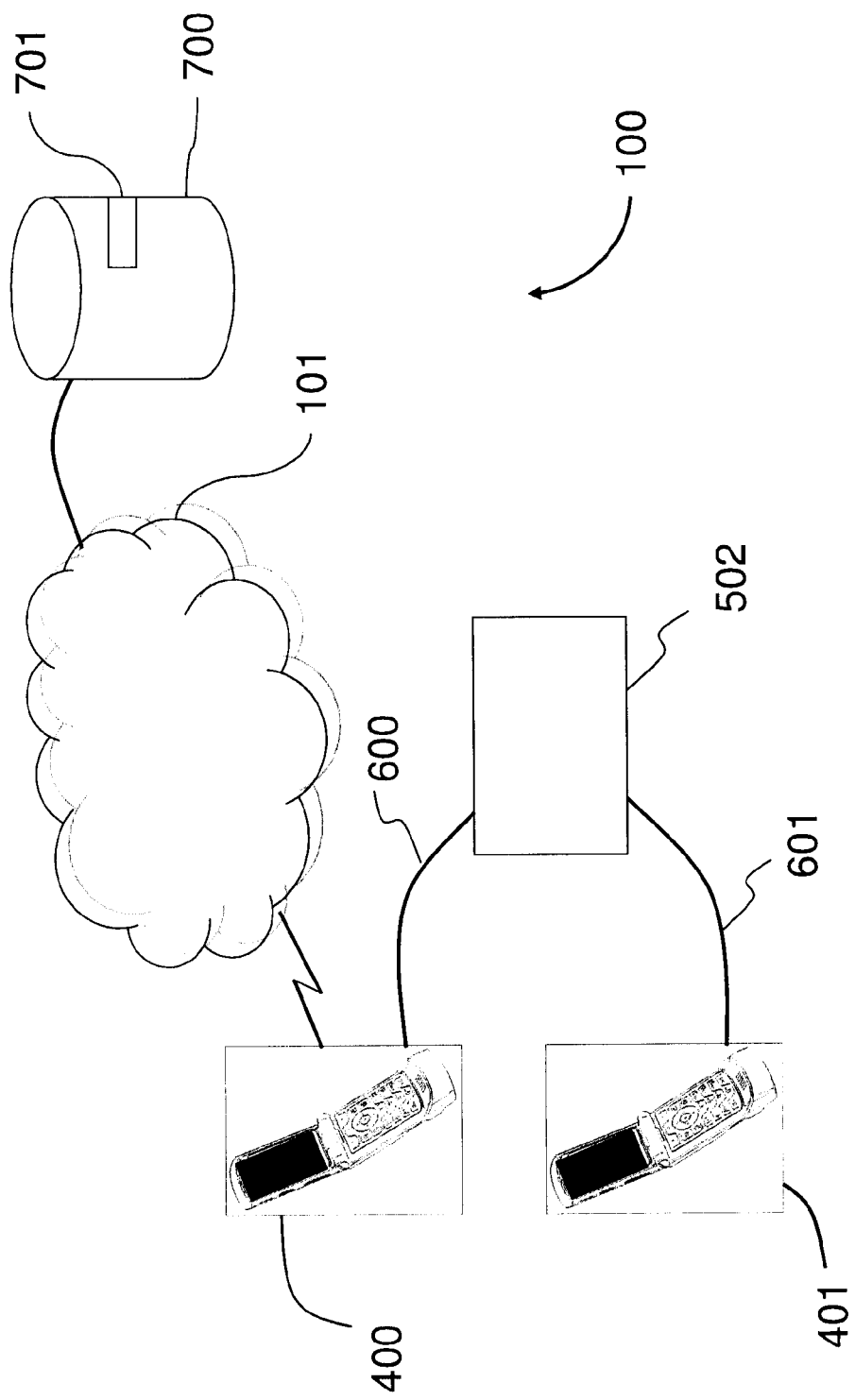
FIG. 4 illustrates a further embodiment of the present invention.

With reference to FIG. 4 of the Drawings, there is illustrated a network 100, such as the aforementioned distributed communications network. In this figure, the ultimate goal of the Web 3.0 movement is visualized. As shown in FIG. 4, a wireless cell phone or other communications device 400 operates within the network 100 and communicates via a telecommunications linkage and/or an Internet linkage, generally designated by the reference numeral 101, but well understood by one skilled in the art, and also discussed in some detail hereinabove. As shown, information, generally designated by the reference numeral 701, can be stored on a remote server 700, upon which the user's (or another's) data, work space or environment information resides, in whole or in part.

Pursuant to the methodology of the present invention, and in accord with the philosophy of the Web 3.0 movement, the device 400, whether a cell phone, Blackberry, Palm or other communicator, is the broadband "bit pipe," i.e., the device 400 provides the pathway for Internet or remote data and the one-to-one physical correspondence between the user and the Internet. The user's computer or other physical devices associated with the user, generally designated in the figure by the reference numeral 502, are thereby virtualized, and the Application Specific Protocol (ASP) model is elevated to the top of the Internet software stack, which assumes that the other types of controllers, e.g., games, can also use the same or similar methods. It is, therefore, understood that the devices 502 can constitute the aforedescribed desktop devices and components 501, which may be personal to the user, e.g., their PC, or otherwise utilized by the user, e.g., other's equipment.

Pursuant to another embodiment of the present invention, the user of the device 400 controls the device 502 through the device 400, as described, and also releases the device or devices 502 when done, e.g., wither private or public devise controlled by the user through the device 400, at the end of a session.

It should further be understood that although the usage of the software shown in single user, there are instances where two or more individuals may desire to attach to the same device or devices 502, e.g., in a gaming environment. As shown in FIG. 4, another user, employing a separate wireless device 401, may be connected to the same device or devices 502.

It should be understood that the interconnection between the wireless device 400, as well as wireless devices 401, to the device, devices or components 502, can be either wireless or wireline. The respective interconnections are designated by the reference numerals 600 and 601, respectively.

It should be understood that the user may control particular components within the devices 502, e.g., a speaker within a speaker system, and not the entire system. Allowing granularity of control permits the user to only access desired components, e.g., on another's system only accessing the big screen television and not the speaker system.

It should be understood that the aforementioned capabilities of interconnectivity of the cell phone to physical components represent exemplary usages. With greater bandwidth and functionality, additional capabilities may be realized.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A method for facilitating user connectivity, comprising:
downloading, by a user on a wireless device in a communications network from a server in said communications network, user information to said wireless device;
transmitting, under user control on said wireless device, the downloaded user information from said wireless device to a peripheral device; and
operating said peripheral device from said wireless device,
wherein said peripheral device, controlled by said user from said wireless device, is connected to a separate system, and
wherein said peripheral device includes a display screen, and
using, responsive to an output from said display screen, at least one input peripheral device,
thereby enabling interactive and real time communications between the peripheral device and the server.

2. The method according to claim 1, further comprising:
in said transmitting, said display screen comprises an interactive multi-touch display screen; and
using, responsive to an output from said interactive multi-touch display screen, at least one input capability of said multi-touch display screen.

3. The method according to claim 1, wherein the downloaded user information on said peripheral device creates an environment selected from the group consisting of a desktop computing environment, a media center environment, a portable PC computing environment, a tablet computer computing environment and combinations thereof.

4. The method according to claim 1, wherein said peripheral device receives a wireline communication containing said downloaded user information transmitted from said wireless device.

5. The method according to claim 1, wherein said peripheral device comprises personal equipment of said user.

6. The method according to claim 1, wherein said peripheral device comprises personal equipment of a third party being used by said user.

7. The method according to claim 1, wherein said transmitting comprises a wireline connection between said wireless device and said peripheral device.

8. The method according to claim 1, wherein said transmitting comprises a wireless connection between said wireless device and said peripheral device.

9. The method according to claim 1, wherein said peripheral device comprises an input device,
said user inputs commands into said input device, and
said commands being relayed through said wireless device.

10. The method according to claim 1, further comprising:
controlling, by said user, said peripheral device at a wireless input device.

11. A wireless device for facilitating user connectivity, comprising:
means for connecting a user of said wireless device to user information stored on a server in a communications network;
means for downloading said user information to said wireless device;
means for relaying the downloaded user information, at the control of said user, to a peripheral device; and
means for operating said peripheral device from said wireless device,
wherein said peripheral device, controlled by said user from said wireless device, is connected to a separate system, and
wherein said peripheral device comprises a hub,
whereby a plurality of components connected to said peripheral device are accessible therethrough.

12. The wireless device according to claim 11, further comprising:
means for receiving, at said peripheral device, a wireless communication containing said downloaded user information transmitted from said wireless device; and
means for employing, at said peripheral device, said downloaded user information.

13. The wireless device according to claim 11, further comprising:
means for receiving, at said peripheral device, a wireline communication containing said downloaded user information transmitted from said wireless device; and
means for employing, at said peripheral device, said downloaded user information.

14. The wireless device according to claim 11, wherein said peripheral device comprises personal equipment of said user.

15. The wireless device according to claim 11, wherein said peripheral device comprises personal equipment of a third party being used by said user.

16. The wireless device according to claim 11, wherein said means for relaying comprises a wireline connection between said wireless device and said peripheral device.

17. The wireless device according to claim 11, wherein said means for relaying comprises a wireless connection between said wireless device and said peripheral device.

18. The wireless device according to claim 11, wherein said peripheral device comprises an input device, and
wherein said user inputs commands into said input device, said commands being relayed through said wireless device.

19. The wireless device according to claim 11, wherein said peripheral device is controlled by said user at a wireless input device.

20. A peripheral device control system, comprising:
a peripheral device;
an interconnector, said interconnector connecting, at the control of a user, a wireless device to said peripheral device, and downloading user information to said peripheral device,
said user information being stored on a server in a communications network; and
said peripheral device, upon receipt of the downloaded user information, employing said user information at the control of said user,
wherein said peripheral device, controlled by said user from said wireless device, is part of a separate system, and
wherein said downloaded user information employed by said peripheral device creates an environment selected from the group consisting of desktop computing environment, a media center environment, a portable PC computing environment, a tablet computer computing environment and combinations thereof.

21. The peripheral device control system according to claim 20, further comprising:

means for receiving, at said peripheral device, a wireless communication containing said downloaded user information transmitted from said wireless device; and means for employing, at said peripheral device, said downloaded user information.

22. The peripheral device control system according to claim 20, further comprising:

means for receiving, at said peripheral device, a wireline communication containing said downloaded user information transmitted from said wireless device; and means for employing, at said peripheral device, said downloaded user information.

23. The peripheral device control system according to claim 20, wherein said peripheral device comprises personal equipment of said user.

24. The peripheral device control system according to claim 20, wherein said peripheral device comprises personal equipment of a third party being used by said user.

25. The peripheral device control system according to claim 20, wherein said means for relaying comprises a wireline connection between said wireless device and said peripheral device.

26. The peripheral device control system according to claim 20, wherein said means for relaying comprises a wireless connection between said wireless device and said peripheral device.

27. The peripheral device control system according to claim 20, wherein said peripheral device comprises an input device, and wherein said user inputs commands into said input device, said commands being relayed through said wireless device.

28. The peripheral device control system according to claim 20, wherein said peripheral device is controlled by said user at a wireless input device.

29. The peripheral device control system according to claim 28, wherein, under respective user control on said respective wireless devices, downloaded user information is transmitted to said peripheral device.

30. The peripheral device control system according to claim 28, wherein said peripheral device is operated from at least one of said wireless devices.

31. The peripheral device control system according to claim 28, wherein, in response to an output from said peripheral device, input devices connected to the respective wireless devices are used.

32. The peripheral device control system according to claim 28, wherein said peripheral device is selected from the group consisting of a display screen, a speaker system and combinations thereof.

33. The peripheral device control system according to claim 20, wherein a plurality of users on a respective plurality of wireless devices download user information from said server to said plurality of wireless devices.

34. A method for facilitating user connectivity, comprising:

downloading, by a user on a wireless device in a communications network from a server in said communications network, user information to said wireless device;

transmitting, under user control on said wireless device, the downloaded user information from said wireless device to a peripheral device in the form of a display screen, operating said peripheral device from said wireless device; and responding to an output from said peripheral device by using input devices available on the wireless device to communicate with the server, wherein said peripheral device, controlled by said user from said wireless device, is connected to a separate system, thereby enabling interactive and real time communications between the peripheral device and the server.

35. The method according to claim 34, wherein the downloaded user information on said peripheral device creates an environment selected from the group consisting of a desktop computing environment, a media center environment, a portable PC computing environment, a tablet computer computing environment and combinations thereof.

36. The method according to claim 34, wherein said peripheral device receives a wireline communication containing said downloaded user information transmitted from said wireless device.

37. The method according to claim 34, wherein said peripheral device comprises personal equipment of said user.

38. The method according to claim 34, wherein said peripheral device comprises personal equipment of a third party being used by said user.

39. The method according to claim 34, wherein said transmitting comprises a wireline connection between said wireless device and said peripheral device.

40. The method according to claim 34, wherein said transmitting comprises a wireless connection between said wireless device and said peripheral device.

41. The method according to claim 34, wherein said peripheral device comprises an input device, said user inputs commands into said input device, and said commands being relayed through said wireless device.

42. The method according to claim 34, further comprising:

controlling, by said user, said peripheral device at a wireless input device.

43. The method according to claim 34, wherein said peripheral device comprises a display screen.

44. The method according to claim 43, wherein said display screen comprises an interactive multi-touch display screen, and further comprising:

using, responsive to an output from said interactive multi-touch display screen, at least one input capability of said multi-touch display screen.

45. A method for facilitating user connectivity, comprising:

downloading, by a plurality of users, onto a respective plurality of wireless devices in a communications network from a server in said communications network, user information to said wireless devices;

transmitting, under respective user control on respective wireless devices, the downloaded user information from said wireless devices to at least one display screen, operating said at least one display screen from at least one of said wireless devices; and responding to an output from said at least one display screen by using input devices connected to the respective said wireless devices, thereby communicating with the server, wherein said at least one display screen, controlled by said respective users, is connected to a separate system, thereby enabling interactive and real time communications between the at least one display screen and the server.

46. The method according to claim 45, wherein the downloaded user information on said display screen creates an environment selected from the group consisting of a desktop computing environment, a media center environment, a portable PC computing environment, a tablet computer computing environment and combinations thereof.

47. The method according to claim 45, wherein said display screen receives a wireline communication containing said downloaded user information transmitted from at least one of said wireless devices.

48. The method according to claim 45, wherein said display screen comprises personal equipment of one of said plurality of users.

49. The method according to claim 45, wherein said display screen comprises personal equipment of a third party being used by one of said plurality of users.

50. The method according to claim 45, wherein said transmitting comprises a wireline connection between at least one of said wireless devices and said display screen.

51. The method according to claim 45, wherein said transmitting comprises a wireless connection between at least one of said wireless devices and said display screen.

52. The method according to claim 45, wherein said display screen comprises an input device,
said user inputs commands into said input device, and
said commands being relayed through said wireless device.

53. The method according to claim 45, further comprising:
controlling, by at least one of said plurality of users, said display screen at a wireless input device.

54. The method according to claim 45, wherein said display screen comprises an interactive multi-touch display screen, and further comprising:
using, responsive to an output from said interactive multi-touch display screen, at least one input capability of said multi-touch display screen.

55. The method according to claim 45, wherein said transmitting, under respective user control on respective wireless devices, transmits the downloaded user information from said wireless devices to at least one display screen and at least one speaker system.

56. The method according to claim 55, wherein said operating operates said at least one display screen and said at least one speaker system from at least one of said wireless devices.

57. The method according to claim 55, wherein said responding responds to an output from said at least one display screen or said at least one speaker system by using input devices connected to the respective said wireless devices.

58. A wireless device for facilitating user connectivity, comprising:
means for connecting a user of said wireless device to user information stored on a server in a communications network;
means for downloading said user information to said wireless device;
means for relaying the downloaded user information, at the control of said user, to a peripheral device, said peripheral device being connected to another device selected from the group consisting of a portable PC, tablet computer, desktop computer and media center; and
means for operating said peripheral device from said wireless device,
whereby said peripheral device is selected from the group consisting of a keyboard, a monitor, a mouse, speakers, a wireline hub, and combinations thereof.

59. The wireless device according to claim 58, wherein the downloaded user information on said peripheral device creates an environment selected from the group consisting of a desktop computing environment, a media center environment, a portable PC computing environment, a tablet computer computing environment and combinations thereof.

60. The wireless device according to claim 58, further comprising:
means for receiving, at said peripheral device, a wireless communication containing said downloaded user information transmitted from said wireless device; and
means for employing, at said peripheral device, said downloaded user information.

61. The wireless device according to claim 58, further comprising:
means for receiving, at said peripheral device, a wireline communication containing said downloaded user information transmitted from said wireless device; and
means for employing, at said peripheral device, said downloaded user information.

62. The wireless device according to claim 58, wherein said peripheral device comprises personal equipment of said user.

63. The wireless device according to claim 58, wherein said peripheral device comprises personal equipment of a third party being used by said user.

64. The wireless device according to claim 58, wherein said means for relaying comprises a wireline connection between said wireless device and said peripheral device.

65. The wireless device according to claim 58, wherein said means for relaying comprises a wireless connection between said wireless device and said peripheral device.

66. The wireless device according to claim 58, wherein said peripheral device comprises an input device, and
wherein said user inputs commands into said input device, said commands being relayed through said wireless device.

67. The wireless device according to claim 58, wherein said peripheral device is controlled by said user at a wireless input device.

68. A wireless device for facilitating user connectivity, comprising:
means for connecting a user of said wireless device to user information stored on a server in a communications network;
means for downloading said user information to said wireless device;
means for relaying the downloaded user information, at the control of said user, to a peripheral device, said peripheral device being connected to a separate system; and
means for operating said peripheral device from said wireless device,
whereby the downloaded user information on said peripheral device creates an environment selected from the group consisting of a desktop computing environment, a media center environment, a portable PC computing environment, a tablet computer computing environment and combinations thereof.

69. The wireless device according to claim 68, further comprising:
means for receiving, at said peripheral device, a wireless communication containing said downloaded user information transmitted from said wireless device; and
means for employing, at said peripheral device, said downloaded user information.

70. The wireless device according to claim 68, further comprising:
means for receiving, at said peripheral device, a wireline communication containing said downloaded user information transmitted from said wireless device; and
means for employing, at said peripheral device, said downloaded user information.

71. The wireless device according to claim 68, wherein said peripheral device comprises personal equipment of said user.

72. The wireless device according to claim 68, wherein said peripheral device comprises personal equipment of a third party being used by said user.

73. The wireless device according to claim 68, wherein said means for relaying comprises a wireline connection between said wireless device and said peripheral device.

74. The wireless device according to claim 68, wherein said means for relaying comprises a wireless connection between said wireless device and said peripheral device.

75. The wireless device according to claim 68, wherein said peripheral device comprises an input device, and
wherein said user inputs commands into said input device, said commands being relayed through said wireless device.

76. The wireless device according to claim 68, wherein said peripheral device is controlled by said user at a wireless input device.

* * * * *